June 24, 1930.   L. M. WOOLSON   1,766,866
MOTOR VEHICLE
Filed Dec. 26, 1924
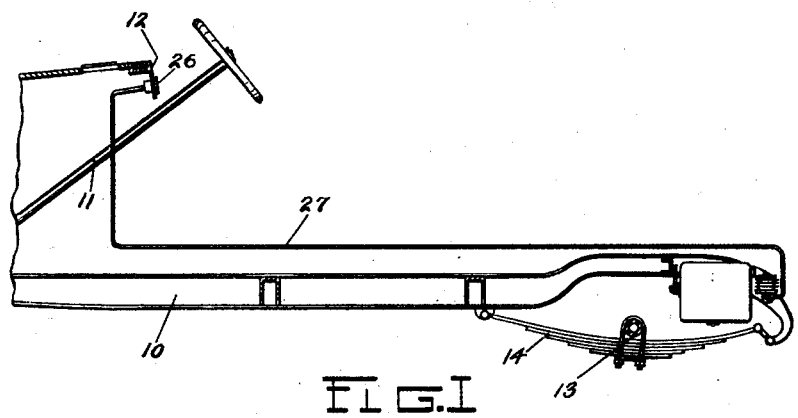
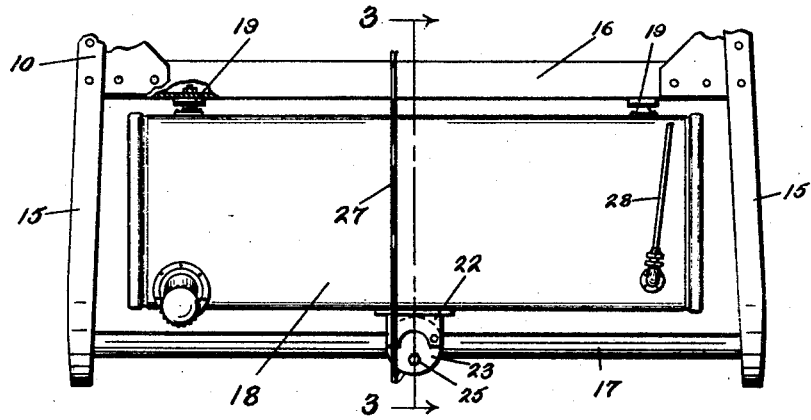
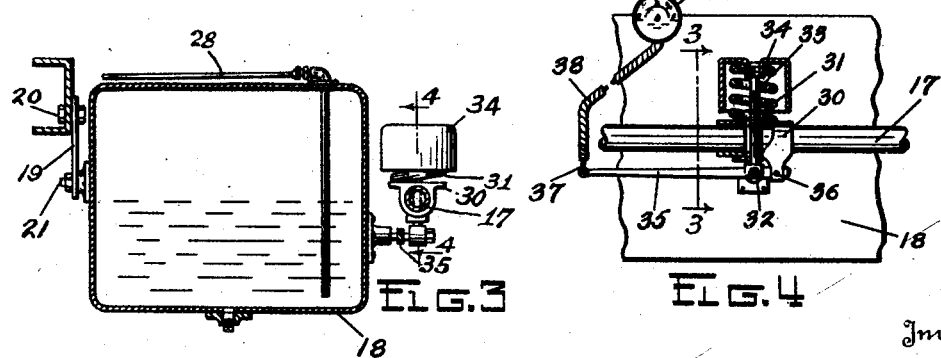
Inventor
Lionel M. Woolson Patented June 24, 1930

1,766,866

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed December 26, 1924. Serial No. 758,029.

This invention relates to motor vehicles and particularly to means for supporting the fuel tank on the frame and for indicating the weight of the tank or the amount of fuel in the tank.

One of the objects of the present invention is to provide a simple and inexpensive device on a motor vehicle for indicating the amount of gasoline in the tank.

Another object of the invention is to provide a support for a fuel tank that may be used to actuate a gauge that will indicate the weight of a tank and consequently the amount of fuel therein.

Other objects of the invention will appear from the following description taken in connection with the drawing, which forms a part of this specification, and in which:

Fig. 1 is a side elevation of a portion of a motor vehicle embodying the invention, the pipe line for the gauge being indicated somewhat diagrammatically.

Fig. 2 is a plan view of the rear end of the vehicle shown in Fig. 1.

Fig. 3 is a vertical section substantially on the line 3—3 of Fig. 2, this being somewhat enlarged, and Fig. 4 is a section substantially on the line 4—4 of Fig. 3.

Referring to the drawings, 10 represents the frame of a motor vehicle, 11 is the steering gear and 12 the instrument board, mounted on the frame. 13 is the rear axle and 14 is one of the springs connecting the axle to the frame.

In Fig. 2, the frame itself is indicated at 10 and the side bars thereof are indicated at 15 and two of the cross bars at 16 and 17. The cross bar 16 is shown as of channel section and the cross bar 17 is of tubular form, and these cross bars are separated to provide a space between them for the fuel tank. Such tank is indicated at 18 and is thus arranged at the rear end of the frame remote from the driver's seat, that is, remote from the instrument board 12.

Various complicated devices have been provided heretofore for indicating the amount of gasoline or other fuel in the tank thus arranged and these devices are frequently out of order and difficult to maintain in proper condition. The present invention is based upon the weight of the fuel causing a compression of one of the connections between the fuel tank and frame and this relative movement between the tank and the frame is communicated to a suitable gauge on the instrument board 12.

In the form of the invention shown, the tank 18 is connected to the cross member 16 of the frame at two separate points, these connections being shown in the form of metal or other straps 19 which are connected by bolts 20 to the frame and bolts 21 to the tank. These connections are particularly well shown in Figs. 1, 2 and 3 and it is obvious that they support one side of the tank 18.

On the other side of the tank a form of compressible support for the tank is shown. In this a bracket 30 on the cross member 17 of the frame supports a spring 31, and the tank 18 is connected to the spring by a pivot 32, a bolt 33, and a cap 34. The bolt 33 preferably extends down through the spring 31 and through the cross member 17 so that the pivot 32 is beneath the cross member. With this connection, it is obvious that the spring 31 will be compressed as the tank 18 is filled with fuel and consequently the bolt 33 will move vertically relative to the cross member 17.

For indicating this movement and consequently the degree of fullness of the tank, a gauge 26 is located on another part of the vehicle. A lever 35 is provided and pivotally connected at 32 to the bolt 33 and pivotally connected at 36 to the bracket 30. The long arm of the lever 35 is connected to a Bowden wire 37 which extends through a tube 38 and connects with the indicator of the gauge 26. Thus the tank may move relative to the cross member 17 about one-eighth of an inch between "full" and "empty" and the end of the long arm of the lever 35 will move about one and one-quarter inches thus giving very definite control of the gauge 26.

It will be understood that various forms of the invention other than those described above may be used without departing from the spirit or scope of the invention.

What is claimed is:

1. In a motor vehicle, the combination of a frame having side members and separate cross members, a fuel tank arranged between said cross members, flexible supporting means connecting the tank to one of said cross members, supporting means connecting said tank to the other of said cross members and including a resilient deformable device responsive to the weight of fuel in the tank, a gauge, a tube between the gauge and said device, and means to transmit compressive and expansive movements of said device through the tube to said gauge.

2. In a motor vehicle, in combination, a frame having side members and separate cross members, a tank arranged between the cross members, substantially vertical strips connecting one side of the tank to one of the cross members, a compressible device on the other of said cross members, and a connection from said tank to said compressible device whereby the other side of the tank is supported by said device, a gauge, and means comprising a substantially non-compressible medium and connecting said gauge and said device, whereby the weight of said tank is indicated.

3. In a motor vehicle, in combination, a frame, a tank, a connector between the tank and frame flexible in one direction to provide for tilting movement of the tank due to the varying weight therein, and another connector between the tank and the frame to resist such tilting movement and comprising a member compressible in a direction different from the direction of flexing of the first connector, and means controlled in accordance with compression of the compressible member to indicate the weight of the tank and its contents.

4. In a motor vehicle, a frame, a tank, a connector between the frame and tank flexible in one direction to provide for tilting movement of the tank due to the varying weight therein, and a second connector compressible in a direction substantially normal to the direction of flexing of the first connector to resist the tilting movement of the tank, and means controlled in accordance with movement of the second connector to indicate the weight of the tank and its contents.

In testimony whereof I affix my signature.

LIONEL M. WOOLSON.